United States Patent
Liu

(10) Patent No.: US 9,654,399 B2
(45) Date of Patent: May 16, 2017

(54) METHODS AND DEVICES IN AN IP NETWORK FOR CONGESTION CONTROL

(75) Inventor: Junhui Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/368,423

(22) PCT Filed: Dec. 28, 2011

(86) PCT No.: PCT/CN2011/084789
§ 371 (c)(1),
(2), (4) Date: Jun. 30, 2014

(87) PCT Pub. No.: WO2013/097103
PCT Pub. Date: Jul. 4, 2013

(65) Prior Publication Data
US 2014/0321289 A1    Oct. 30, 2014

(51) Int. Cl.
*H04L 12/801* (2013.01)
*H04L 12/833* (2013.01)
*H04L 29/06* (2006.01)

(52) U.S. Cl.
CPC .............. *H04L 47/12* (2013.01); *H04L 47/17* (2013.01); *H04L 47/31* (2013.01); *H04L 47/33* (2013.01); *H04L 69/163* (2013.01)

(58) Field of Classification Search
None
See application file for complete search history.

(56) References Cited

U.S. PATENT DOCUMENTS

2002/0009073 A1* 1/2002 Furukawa ........... H04L 65/1069
370/352
2002/0089930 A1* 7/2002 Aceves ............. H04W 28/0242
370/230

(Continued)

FOREIGN PATENT DOCUMENTS

CN            101188611 A        5/2008
CN            101253729 A        8/2008
(Continued)

OTHER PUBLICATIONS

Balakrishnan, H. et al., "TCP Performance Implications of Network Path Asymmetry", Network Working Group, Request for Comments: 3449, Dec. 2002, 1-42.

(Continued)

*Primary Examiner* — Sulaiman Nooristany
(74) *Attorney, Agent, or Firm* — Murphy, Bilak & Homiller, PLLC

(57) ABSTRACT

The invention relates to a method 30 in a packet forwarding device 2 in an Internet Protocol, IP, network 10 for congestion control. The method 30 comprises: receiving 31 an IP packet 20 originating from a first network node 11 and addressed to a second network node 3; determining 32 a congestion status on a network path from the second network node 13 to the first network node 11; and entering 33, for a congestion status indicating congestion, congestion information into a header 21, 22 of the IP packet 20, the congestion status congestion information notifying the second network node 13 about congestion present on the network path. The invention also relates to a packet forwarding device 12, a computer program 43 and computer program product 44.

18 Claims, 3 Drawing Sheets

(56) References Cited

U.S. PATENT DOCUMENTS

| | | | |
|---|---|---|---|
| 2010/0088437 A1 | 4/2010 | Zahavi | |
| 2011/0158096 A1* | 6/2011 | Leung | H04L 1/0079 |
| | | | 370/232 |
| 2011/0205895 A1* | 8/2011 | Chen | H04L 47/10 |
| | | | 370/231 |

FOREIGN PATENT DOCUMENTS

| | | |
|---|---|---|
| CN | 102158896 A | 8/2011 |
| WO | 0145331 A1 | 6/2001 |

OTHER PUBLICATIONS

Molle, Mart et al., "Short-circuiting the congestion signaling path for AQM algorithms using reverse flow matching", Computer Communications, Elsevier Science Publishers BV, Amsterdam, NL, vol. 28, No. 18, Sep. 18, 2004, 2082-2093.

Ramakrishnan, K. et al., "The Addition of Explicit Congestion Notification (ECN) to IP", Internet Engineering Task Force, Network Working Group, Request for Comments: 3168, Category: Standards Track, Sep. 2001, pp. 1-57.

\* cited by examiner

METHODS AND DEVICES IN AN IP NETWORK FOR CONGESTION CONTROL

TECHNICAL FIELD

The technology disclosed herein relates generally to the field of internet protocol, IP, networks, and in particular to congestion control within such IP networks.

BACKGROUND

The most widely used communication protocol for reliable data delivery in the Internet is Transmission Control Protocol (TCP). In data networks, network congestion occurs when a link or node is carrying so much data that its quality of service deteriorates. The TCP comprises congestion control mechanisms, which aim at achieving good bandwidth utilization while avoiding congestion collapses during which the performance of a network can fall by several orders of magnitude.

The TCP congestion control mechanisms assume that packet drops are caused by congestion. Upon detection of packet drops, a TCP sending node will slow down its transmission speed, trying to relieve the congestion. On the other hand, in order to achieve better bandwidth utilization, the TCP sending node will try to increase its transmission speed if packets are successfully delivered. In most cases, the increment of transmission speed will end up with packet drops due to congestion, and then the transmission speed is lowered again.

In addition to the TCP sending nodes and receiving nodes, intermediate network nodes such as routers and switches can also be involved in TCP congestion control mechanisms in order to achieve an improved end to end quality of service. Two major congestion control mechanisms are widely recognized: Random Early Drop (RED) and Explicit Congestion Notification (ECN).

The RED is designed to prevent the effect of TCP "global synchronization", wherein almost all TCP sending nodes slow down their transmission speed simultaneously upon detecting congestion, and almost all TCP sending nodes then also increase their transmission speed simultaneously. The network will switch between under-utilized and congested state. With RED, the intermediate network node will randomly drop TCP packets at an early stage of congestion, thereby slowing down some of the TCP sending nodes. The dropping probability increases as the congestion status is growing more severe. The RED is thus trying to prevent the network nodes to enter a severe congestion state and also avoid a global synchronization.

ECN is another mechanism for avoiding congestion. ECN is an extension of TCP which needs the support of the TCP sending node, the TCP receiving node and intermediate ECN enabled nodes (e.g. routers or switches).

FIG. 1 illustrates the principles of the ECN. In a network implementing ECN, the TCP sending node 1 (source) sends (arrow A1) a packet with ECN capable transport (ECT) code point in the Differentiated services code point (DSCP) in the packet header. The packet reaches an ECN enabled node 2, and if experiencing congestion, the ECN enabled node 2 modifies the DSCP to Congestion Experienced (CE) and forwards the packet (arrow A2). A TCP receiving node 3 (receiver) receives the packet having CE in a header field, and sets an ECN echo (ECE) flag in the TCP header in following TCP packets (Arrow A3). The TCP sending node 1 receives the TCP packet comprising the ECE flag and reduces its congestion window and sends a TCP packet comprising a Congestion Window Reduced (CWR) flag in response (Arrow A4). The CWR flag informs the TCP receiving node 3 that the congestion notification has been processed.

A basic distinction between RED and ECN is that ECN allows end-to-end notification of network congestion without dropping packets. However, in the ECN congestion control mechanism a sending node may keep sending IP packets for a while with the same IP packet transmission speed. This can worsen the congestion situation and cause packet drops. The sending node keeps sending the IP packets until being notified about the congestion, upon which it can reduce its transmission speed.

SUMMARY

An object is to obviate at least some of the above disadvantages and provide methods and devices providing an improved congestion control in IP networks.

The object is according to a first aspect achieved by a method in a packet forwarding device in an Internet Protocol, IP, network for congestion control. The method comprises receiving an IP packet originating from a first network node and addressed to a second network node; determining a congestion status on a network path from the second network node to the first network node; and entering, for a congestion status indicating congestion, congestion information into a header of the IP packet, the congestion information notifying the second network node about congestion present on the network path.

The method enables a network node to reduce its IP packet transmission speed with minimized delay upon detection of a congestion situation. A traffic source, e.g. a Web server, may be notified about a congestion status very early and can reduce its transmission speed instantly. The number of lost packets can thereby be reduced and the quality of service thus be increased.

The object is according to a second aspect achieved by a packet forwarding device for relaying Internet Protocol, IP, packets between a first network node and a second network node of an IP network. The packet forwarding device comprises a processing unit and input device. The processing unit is configured to: receive, from the input device, an IP packet originating from a first network node and addressed to a second network node; determine congestion status on a network path from the second network node to the first network node; and enter, for a congestion status indicating congestion, congestion information into a header of the IP packet, the congestion information notifying the second network node about congestion present on the network path.

The packet forwarding device is enabled to inform a packet receiving device about congestion on the path from the packet receiving device and back to the source device. Thereby an early congestion notification is provided, with minimal delay in the notification process.

The object is according to a third aspect achieved by a computer program for a packet forwarding device for congestion control. The computer program comprises computer program code, which, when run on the packet forwarding device, causes the packet forwarding device to perform the steps of: receiving an IP packet originating from a first network node and addressed to a second network node; determining congestion status on a network path from the second network node to the first network node; and entering, for a congestion status indicating congestion, congestion information into a header of the IP packet, the congestion information notifying the second network node about congestion present on the network path.

Advantages corresponding to the above described are thereby obtained.

The object is according to a fourth aspect achieved by a computer program product comprising a computer program as above, and a computer readable means on which the computer program is stored.

Further features and advantages of the invention will become clear upon reading the following description and the accompanying drawings.

DETAILED DESCRIPTION

Figure 1:
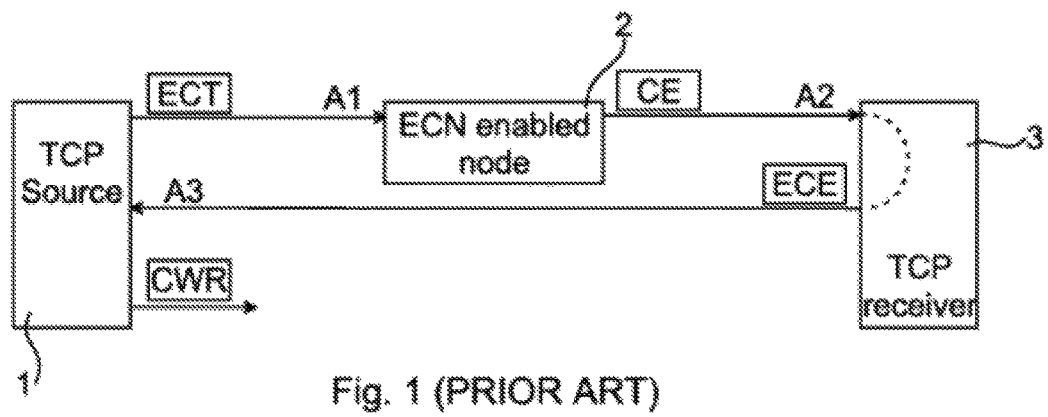
FIG. 1 illustrates an IP network and a prior art congestion control method performed therein.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
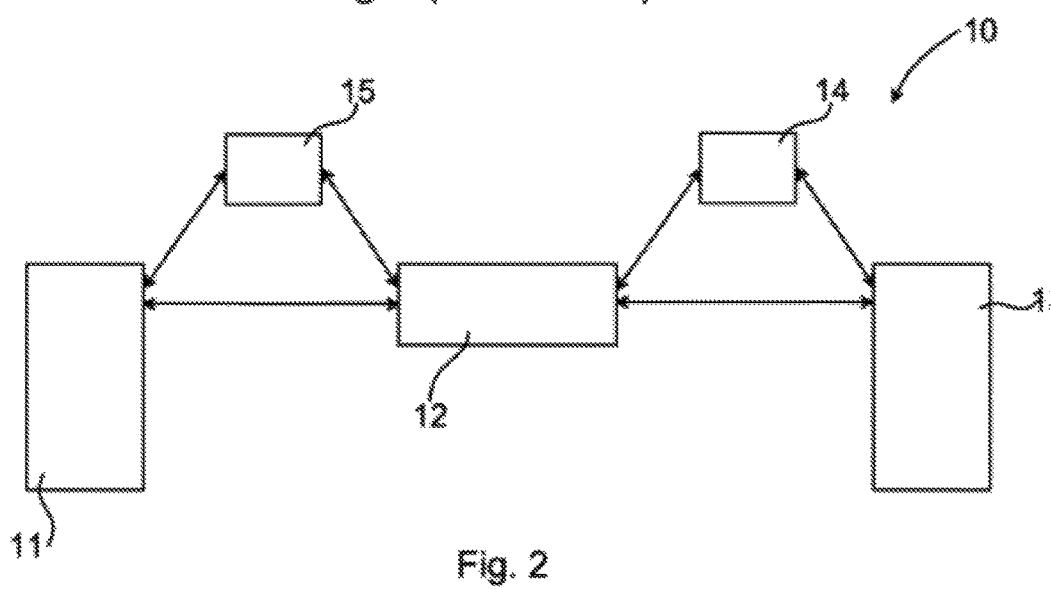
FIG. 2 illustrates schematically an environment in which embodiments of the invention may be implemented.

FIG. 2 illustrates schematically an environment in which embodiments of the invention may be implemented. In particular, an Internet Protocol (IP) network 10 comprises a first network node 11 and a second network node 13. The IP network 10 further comprises a packet forwarding device 12 that relays IP packets between the first network node 11 and the second network node 13. It is noted here that the routing of IP packets between the first and second node is symmetric with respect to the packet forwarding device 12 in the sense that IP packets from the first network node 11 to the second network node 13 as well as packet from the second network node 13 to the first network node 11 pass through the packet forwarding device 12. The packet forwarding device 12 may for example comprise a router or switch.

A network path from the first network node 11 to the second network node 12 thus passes the packet forwarding device 12. The network path may go through yet additional network nodes. Two such additional network nodes are illustrated in FIG. 2. A third network node 14 is located along the network path between the packet forwarding device 12 and the second network node 13, and a fourth network node 15 is located along the network path between the packet forwarding device 12 and the first network node 11. It is noted that the number of such additional network nodes is not relevant for the invention, and e.g. the part of the network path going from the first network node 11 to the forwarding device 12 may comprise two or more network nodes although only one is illustrated.

Figure 3:
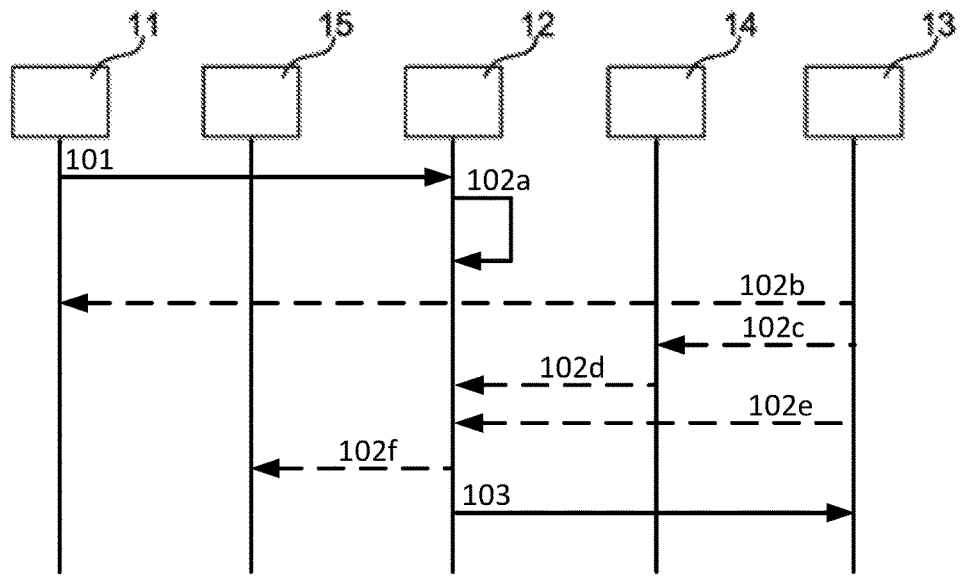
FIG. 3 is a sequence diagram illustrating congestion control.

FIG. 3 is a sequence diagram illustrating a congestion control in accordance with an aspect of the invention. The packet forwarding device 12 receives (arrow 101) an IP packet from the first network node 11, wherein the IP packet is addressed to the second network node 13. This IP packet may go directly to the packet forwarding device 12 or via the fourth network node 15 (or additional network nodes). The packet forwarding device 12 then performs a congestion status determination (arrow 102a). That is, a determination about the congestion status on the network path from the second network node 13 to the first network node 11 is performed. A congestion may exist anywhere on the path from the second network node 13 to the first network node 11 (arrow 102b), e.g. on the path from the second network node 13 to the third network node 14 (arrow 102c), on the path from the third network node 14 to the packet forwarding device 12 (arrow 102d), on the path from the from the second network node 13 to the forwarding device 12 (arrow 102e) in case there is no third network node 14, and/or on the path from the packet forwarding device 12 to the fourth network node 15 (arrow 102f). The determination on congestion status can be done in various ways, which will be described later. If the determined congestion status indicates congestion, the packet forwarding device 12 then notifies the second network node 13 about this (arrow 103).

Figure 4A:
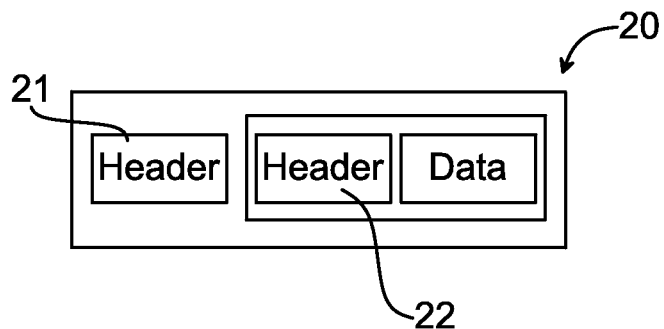
FIGS. 4a and 4b illustrate exemplary IP packets.
Figure 4B:
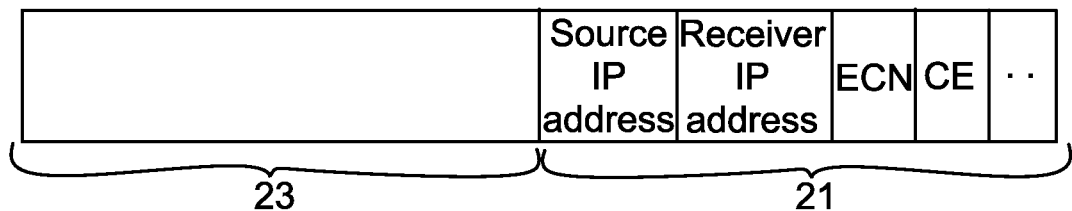

FIGS. 4a and 4b illustrate an exemplary IP packet 20 that can be sent within the IP network 10. The IP packet 20 may comprise an IP header 21 and a transport layer part including a transport layer header (e.g. transmission control protocol, TCP, header) 22 and data (application data). The IP header 21 and/or the transport layer header 22 may comprise the source IP address (e.g. the IP address of the first network node 11) and the receiver IP address (e.g. the IP address of the second network node 13).

FIG. 4b illustrates the particular case of the transport layer header 22 comprising the ECN extension. The transport layer header 22 then comprises, besides the source and receiver addresses, also ECN bits. Such ECN bits may comprise CE bits, which are set upon detection of congestion.

Figure 5:
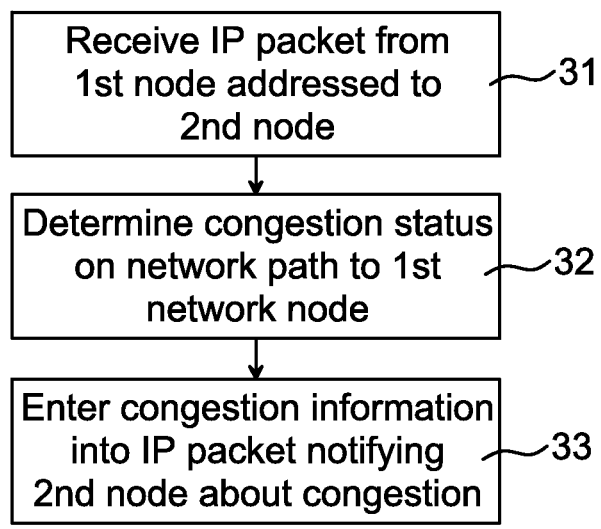
FIG. 5 is a flow chart over steps of a congestion control method in an IP network.

FIG. 5 is a flow chart over steps of a congestion control method in an IP network. The method 30 is performed in the packet forwarding device 12 in the Internet Protocol, IP, network 10 for congestion control. The method 30 comprises receiving 31 an IP packet 20 originating from a first network node 11 and addressed to a second network node 13. The method 30 further comprises determining 32 a congestion status on a network path from the second network node 13 to the first network node 11. The method 30 further comprises entering 33, for a congestion status indicating congestion, congestion information into a header 21, 22 of the IP packet 20, the congestion information notifying the second network node 13 about congestion present on the network path.

The determining 32 of congestion status may be performed in various ways. The determining 32 of congestion status may for example comprise determining the congestion status of the packet forwarding device 12 by determining the number of IP packets in an inbound directed queue from the second network node 13 and/or the number of IP packets in an outbound directed queue to the first network node 11, wherein the congestion status indicates congestion if the number of IP packets exceeds a threshold number.

Further alternatives for the determining 32 of congestion status of the packet forwarding device 12 comprises determining a queuing delay of an inbound directed queue from the second network node 13 and/or a queuing delay of an outbound directed queue to the first network node 11, wherein the congestion status indicates congestion if the queuing delay exceeds a threshold value.

The above exemplifying ways of determining congestion status may also be combined. That is, the number of IP packets and the queuing delay may both be determined, and if any result of the determining indicates a congestion status, the congestion status is accordingly set to indicate congestion.

In other embodiments, the determining 32 of congestion status comprises determining a congestion status of one or more of additional network nodes located along the network path, wherein such additional network nodes relay IP packets originating from the first or second network node. As mentioned earlier, there may be several network nodes between e.g. the first network node 11 and the packet forwarding device 12. For example, if there are three network nodes between the first network node 11 and the packet forwarding device 12, then one is connected to the first network node 11 and to another network node, one is connected between two of the network nodes, and one is connected to one of the network nodes and the packet forwarding device 12. It is then realized that the middlemost network device would relay IP packets between two other networks nodes located along the part of the network path going from the first network node 11 to the packet forwarding device 12.

The determining 32 of congestion status may then, for example, comprise determining congestion status of the third and/or fourth network nodes 14, 15 (refer to FIG. 2), wherein these additional network nodes relay IP packets between the packet forwarding device 12 and the first or the second network node 11, 13. The packet forwarding device 12 could obtain such information in corresponding manner as the described above, e.g. by determining the number of IP packets in an inbound directed queue from e.g. the third network node 14 and/or the number of IP packets in an outbound directed queue to the third network node 14.

The packet forwarding device 12 may obtain congestion related information by means of traffic engineering. The nodes of a network may exchange traffic information such as for example link utilization, reserved bandwidth and available bandwidth. Such traffic engineering information may be carried as an extension to existing routing protocols, e.g. Open Shortest Path First (OSPF).

In an embodiment (refer also to FIGS. 4a and 4b), the entering 33 of congestion information comprises setting an Explicit Congestion Control Echo, ECE, bit in a Transmission Control Protocol, TCP, header 22 of the IP packet 20 or in an IP packet 20 header 21. This can be seen as an improvement of the existing ECN congestion mechanism, wherein the packet forwarding device 12 is an ECN capable device, which receives a TCP packet having an ECT in the DSCP. In contrast to the known ECN solution, wherein the ECN capable device would only modify the DSCP to CE and forward the IP packet, the packet forwarding device 12 also performs a reverse path look up, i.e. determines a congestion status on the path from the second network node 13 to the first network node 11. An improvement lies in a shortened delay compared to the known ECN congestion mechanism, as the packet forwarding device 12 may set the CE bits of the TCP header 22 informing about congestion on the reverse network path. Reverse here is understood as reverse compared to the IP packet direction.

The congestion status may indicate a congestion in: the packet forwarding device 12 or in the third network node 14 located along the network path from the second network node 13 to the forwarding device 12, the third network node 14 relaying IP packets between the packet forwarding device 12 and the second network node 13, or in the fourth network node 15 located along the network path from the first network node 11 to the forwarding device 12, the fourth network node 15 relaying IP packets between the first network node 11 and the forwarding device 14.

As a particular example, the second network node 13 may be a Web server and the first network node 11 may be a user computer. When the user, by means of the user computer, downloads something or browses web pages, the Web server is sending much more data compared to the amount of data sent in the other direction. The Web server tends to cause congestions because of the large amount of data that it sends. By means of the described methods, the Web server is notified about the congestion status very early, since the packet forwarding device 12 instantly, upon receiving a packet from the user, checks up the congestion status on the data path from the Web server to the user.

Figure 6:
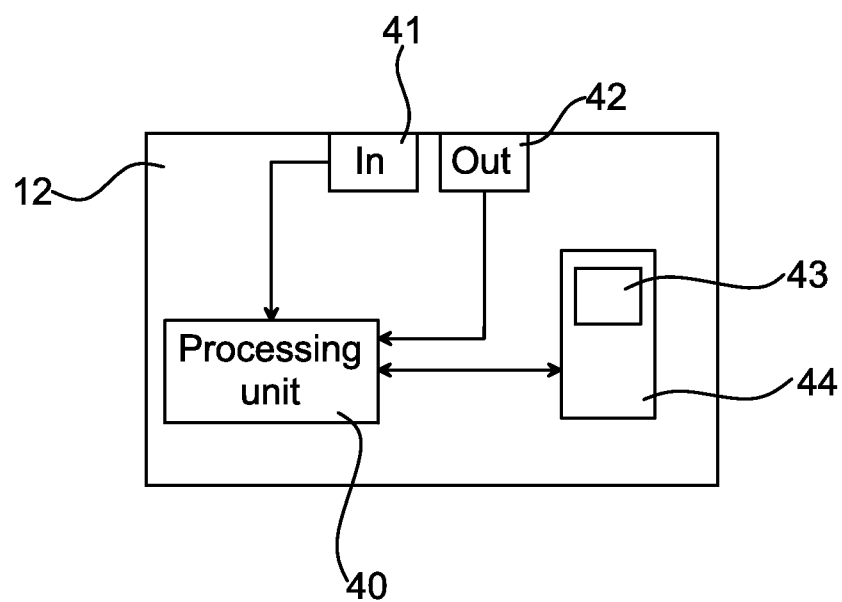
FIG. 6 illustrates a block diagram over a forwarding device.

FIG. 6 illustrates a block diagram over a forwarding device. In particular, the FIG. 6 illustrates means in the forwarding device 12 for implementing the methods as described. The forwarding device 12 comprises a processing unit 40 which is connected to an input device 41, comprising incoming interface connections, and an output device 42 comprising outgoing interface connections. In particular, the input device 41 and the output device 42 may comprise incoming and outgoing network ports, respectively, of the forwarding device 12. The processing unit 40 may further be connected to a computer program 43 carried by a computer program product 44 in the packet forwarding device 12.

The processing unit 40, e.g. a central processing unit (CPU), microcontroller, digital signal processor (DSP), network processor (NPU), an application specific integrated circuit (ASIC), an field programmable gate array (FPGA) etc., is capable of executing software instructions stored in the computer program product 44 e.g. in the form of a memory. It is noted that although only one processing unit 40 is illustrated in FIG. 6, the implementation may comprise distributed hardware so that several processing units are used rather than one when running the software instructions. It is thus noted that a node may have multiple interconnected processing units and e.g. that network ports of the node may be located in different processing units.

The processing unit 40 is configured to perform the methods as described. In particular, the processing unit 40 may be configured to: receive, from the input device 41, an IP packet 20 originating from a first network node 11 and addressed to a second network node 13; determine congestion status on a network path from the second network node 13 to the first network node 11; and enter, for a congestion status indicating congestion, congestion information into a header 21, 22 of the IP packet 20, the congestion information notifying the second network node 13 about congestion present on the network path.

In correspondence with the described method 30, the processing unit 40 may further be configured to determine the congestion status by determining the number of IP packets in an inbound directed queue from the second network node 13 and/or the number of IP packets in an outbound directed queue to the first network node 11, wherein the congestion status indicates congestion if the number of IP packets exceeds a threshold number.

The processing unit 40 may be configured to determine the congestion status by determining a queuing delay of an inbound directed queue from the second network node 13 and/or a queuing delay of an outbound directed queue to the first network node 11, wherein the congestion status indicates congestion if the queuing delay exceeds a threshold value.

In an alternative to or in combination with the above embodiments, the processing unit 40 may be configured to determine the congestion status by determining a congestion status of a network node 14, 15 located along the network path, the network node 14, 15 relaying IP packets between the packet forwarding device 12 and the first or the second network node 11, 13.

The processing unit 40 may be configured to enter the congestion information by setting an Explicit Congestion Control Echo, ECE, bit in a Transmission Control Protocol, TCP, header 22 of the IP packet 20 or in an IP packet 20 header 21.

In correspondence with what has been described earlier for the method 30, the congestion status may indicate a congestion in the packet forwarding device 12 or in a third network node 14 located along the network path from the second network node 13 to the forwarding device 12, the third network node 14 relaying IP packets between the packet forwarding device 12 and the second network node 13, or in a fourth network node 15 located along the network path from the first network node 11 to the forwarding device 12, the fourth network node 15 relaying IP packets between the first network node 11 and the forwarding device 14.

The described methods and algorithms or parts thereof for use in congestion control may be implemented e.g. by software and/or application specific integrated circuits in the forwarding device 12. To this end, the forwarding device 12 may further comprise the computer program 43 stored on the computer program product 44.

With reference still to FIG. 6, the invention also encompasses the computer program 43 for congestion control. The computer program 43 comprises computer program code which when run on the forwarding device 12, and in particular the processing unit 40 thereof, causes the forwarding device 12 to perform the methods as described.

The computer program 43 for a packet forwarding device 12 for congestion control comprises computer program code, which, when run on the packet forwarding device 12, causes the packet forwarding device 12 to perform the steps of: receiving an IP packet 20 originating from a first network node 11 and addressed to a second network node 13; determining congestion status on a network path from the second network node 13 to the first network node 11; and entering, for a congestion status indicating congestion, congestion information into a header 21, 22 of the IP packet 20, the congestion information notifying the second network node 13 about congestion present on the network path.

A computer program product 44 is also provided comprising the computer program 43 as described above and computer readable means on which the computer program 43 is stored. The computer program product 44 may be any combination of read and write memory (RAM) or read only memory (ROM). The computer program product 44 may also comprise persistent storage, which, for example can be any single one or combination of magnetic memory, optical memory, or solid state memory.

The invention claimed is:

1. A method in a packet forwarding device in an Internet Protocol, IP, network for congestion control, the method comprising:
   receiving an IP packet conveying a Transport Control Protocol, TCP, payload originating from a first network node and targeting a second network node, said first and second network nodes operating as TCP endpoints with respect to the TCP payload, and said IP packet going on a forward network path from the first network node to the second network node;
   performing a reverse path look up to determine a congestion status on a reverse network path from the second network node back to the first network node;
   entering, for a congestion status indicating congestion on the reverse network path, congestion information into the IP packet, to provide an indication to the second network node of congestion on the reverse network path; and
   forwarding the IP packet with the entered congestion information towards the second network node.

2. The method as claimed in claim 1, wherein the determining of congestion status comprises determining at least one of the number of IP packets in an inbound directed queue from the second network node and the number of IP packets in an outbound directed queue to the first network node, wherein the congestion status indicates congestion if the number of IP packets exceeds a threshold number.

3. The method as claimed in claim 1, wherein the determining of congestion status comprises determining at least one of a queuing delay of an inbound directed queue from the second network node and a queuing delay of an outbound directed queue to the first network node, wherein the congestion status indicates congestion if the queuing delay exceeds a threshold value.

4. The method as claimed in claim 1, wherein the determining of congestion status comprises determining a congestion status of a network node located along the network path, the network node relaying IP packets between the packet forwarding device and the first or the second network node.

5. The method as claimed in claim 1, wherein the entering of congestion information comprises setting an Explicit Congestion Control Echo, ECE, bit in a Transmission Control Protocol, TCP, header of the IP packet or in an IP packet header.

6. The method as claimed in claim 1, wherein the congestion status indicates a congestion in the packet forwarding device or in a third network node located along the network path from the second network node to the forwarding device, the third network node relaying IP packets between the packet forwarding device and the second network node, or in a fourth network node located along the network path from the first network node to the forwarding device, the fourth network node relaying IP packets between the first network node and the forwarding device.

7. A packet forwarding device for relaying Internet Protocol, IP, packets between a first network node and a second network node of an IP network, the packet forwarding device comprising a processing unit and input device, the processing unit being configured to:
   receive an IP packet conveying a Transport Control Protocol, TCP, payload originating from a first network node and targeting a second network node, said first and second network nodes operating as TCP endpoints with respect to the TCP payload, and said IP packet going on a forward network path from the first network node to the second network node;
   perform a reverse path look up to determine a congestion status on a reverse network path from the second network node back to the first network node;
   enter, for a congestion status indicating congestion on the reverse network path, congestion information into the IP packet, to provide an indication to the second network node of congestion on the reverse network path; and
   forward the IP packet with the entered congestion information towards the second network node.

8. The packet forwarding device as claimed in claim 7, wherein the processing unit is configured to determine the congestion status by determining at least one of the number of IP packets in an inbound directed queue from the second network node and the number of IP packets in an outbound directed queue to the first network node, and wherein the congestion status indicates congestion if the number of IP packets exceeds a threshold number.

9. The packet forwarding device as claimed in claim 7, wherein the processing unit is configured to determine the congestion status by determining at least one of a queuing delay of an inbound directed queue from the second network node and a queuing delay of an outbound directed queue to the first network node, and wherein the congestion status indicates congestion if the queuing delay exceeds a threshold value.

10. The packet forwarding device as claimed in claim 7, wherein the processing unit is configured to determine the congestion status by determining a congestion status of a network node located along the network path, the network node relaying IP packets between the packet forwarding device and the first or the second network node.

11. The packet forwarding device as claimed in claim 7, wherein the processing unit is configured to enter the congestion information by setting an Explicit Congestion Control Echo, ECE, bit in a Transmission Control Protocol, TCP, header of the IP packet or in an IP packet header.

12. The packet forwarding device as claimed in claim 7, wherein the congestion status indicates a congestion in the packet forwarding device or in a third network node located along the network path from the second network node to the forwarding device, the third network node relaying IP packets between the packet forwarding device and the second network node, or in a fourth network node located along the network path from the first network node to the forwarding device, the fourth network node relaying IP packets between the first network node and the forwarding device.

13. The method of claim 1, wherein entering the congestion information comprises entering the congestion information in an IP header of the IP packet.

14. The method of claim 1, wherein entering the congestion information comprises entering the congestion information in a TCP header of the TCP payload conveyed in the IP packet.

15. The method of claim 1, wherein performing the reverse path look up comprises performing a reverse path look that includes at least that portion of the reverse path between the first network node and the forwarding device.

16. The packet forwarding device of claim 7, wherein the processing unit is configured to enter the congestion information in an IP header of the IP packet.

17. The packet forwarding device of claim 7, wherein the processing unit is configured to enter the congestion information in a TCP header of the TCP payload conveyed in the IP packet.

18. The packet forwarding device of claim 7, wherein the processing unit is configured to perform the reverse path look up to include at least that portion of the reverse path between the first network node and the forwarding device.

* * * * *